United States Patent
Huang et al.

(10) Patent No.: US 12,505,805 B2
(45) Date of Patent: Dec. 23, 2025

(54) SHIFT REGISTER UNIT, GATE DRIVE CIRCUIT AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yao Huang, Beijing (CN); Mengmeng Du, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/577,963

(22) PCT Filed: Apr. 6, 2023

(86) PCT No.: PCT/CN2023/086488
§ 371 (c)(1),
(2) Date: Jan. 9, 2024

(87) PCT Pub. No.: WO2024/207286
PCT Pub. Date: Oct. 10, 2024

(65) Prior Publication Data
US 2025/0104786 A1    Mar. 27, 2025

(51) Int. Cl.
*G09G 3/3266* (2016.01)
*G11C 19/28* (2006.01)

(52) U.S. Cl.
CPC ......... *G09G 3/3266* (2013.01); *G11C 19/287* (2013.01); *G09G 2300/0426* (2013.01);
(Continued)

(58) Field of Classification Search
CPC .... G11C 19/287; G11C 19/28; G09G 3/3266; G09G 2300/0426; G09G 2310/0286; G09G 2310/0267; G09G 2310/0264
See application file for complete search history.

(56) References Cited

U.S. PATENT DOCUMENTS

2017/0039971 A1    2/2017   Huang
2017/0294165 A1   10/2017   Park et al.
(Continued)

FOREIGN PATENT DOCUMENTS

CN    103559868 A    2/2014
CN    104700805 A    6/2015
(Continued)

*Primary Examiner* — William Boddie
*Assistant Examiner* — Saifeldin E Elnafia
(74) *Attorney, Agent, or Firm* — Myers Bigel, P.A.

(57) ABSTRACT

A shift register unit including an input circuit configured to receive a first clock signal and an input signal to provide the input signal to a first node; a first control circuit electrically connected to the first node and a second node and configured to receive the first clock signal to control a voltage of the second node; an output circuit electrically connected to the first node and an output terminal and configured to receive a second clock signal to provide an output signal to the output terminal based on the second clock signal; an output voltage control circuit electrically connected to the second node and the output terminal and configured to control a voltage of the output signal; and a discharge circuit electrically connected to the first node and the second node and configured to receive the second clock signal to achieve electrical discharge of the first node.

18 Claims, 9 Drawing Sheets

(52) U.S. Cl.
CPC ............... *G09G 2310/0264* (2013.01); *G09G 2310/0267* (2013.01); *G09G 2310/0286* (2013.01); *G11C 19/28* (2013.01)

(56) References Cited

U.S. PATENT DOCUMENTS

| | | | |
|---|---|---|---|
| 2019/0096306 A1* | 3/2019 | Kong | ..................... G11C 19/28 |
| 2019/0221181 A1* | 7/2019 | Li | ........................... G11C 19/28 |
| 2020/0265877 A1* | 8/2020 | Zheng | ..................... G11C 19/28 |
| 2021/0142709 A1* | 5/2021 | Liu | ........................... G09G 3/20 |
| 2021/0209988 A1 | 7/2021 | Wang et al. | |
| 2021/0241706 A1* | 8/2021 | Huang | ................... G11C 19/28 |
| 2023/0071031 A1 | 3/2023 | Qing et al. | |

FOREIGN PATENT DOCUMENTS

| | | |
|---|---|---|
| CN | 104795106 A | 7/2015 |
| CN | 107274838 A | 10/2017 |
| CN | 110164352 A | 8/2019 |
| CN | 111524490 A | 8/2020 |
| CN | 107274838 B | 8/2021 |
| CN | 113643669 A | 11/2021 |
| JP | 2016-039730 A | 3/2016 |
| KR | 10-2005-0121357 A | 12/2005 |

\* cited by examiner

SHIFT REGISTER UNIT, GATE DRIVE CIRCUIT AND DISPLAY DEVICE

RELATED APPLICATIONS

The present application is the U.S. national phase entry of PCT/CN2023/086488, with an international filing date of Apr. 6, 2023, the entire disclosures of which are incorporated herein by reference.

TECHNICAL FIELD

This application relates to the field of electronic circuit technology, and more specifically, to a shift register unit, a gate drive circuit comprising the shift register unit and a display device comprising the gate drive circuit.

BACKGROUND

Thin film transistors are electronic components commonly used in various display devices, and can be found in both gate drive circuits for providing gate scanning signals and pixel circuits for driving pixels of display devices to emit light. Nowadays, the common types of thin film transistors include low-temperature polycrystalline thin film transistors, metal oxide thin film transistors, amorphous silicon thin film transistors and so on. Different types of thin film transistors have their own advantages and disadvantages. For example, as compared with the manufacture process of amorphous silicon thin film transistors, the manufacture process of low-temperature polycrystalline thin film transistors involves a laser crystallization process and an ion implantation process, so as to turn amorphous silicon thin films into polysilicon, thereby improving the electron mobility significantly. Using low-temperature polycrystalline thin film transistors as drive components can enhance the brightness of liquid crystal displays and decrease the power consumption, and moreover, applying low-temperature polycrystalline thin film transistors in organic light-emitting diode display devices can also achieve a higher resolution. However, the manufacture process of display devices based on low-temperature polycrystalline thin film transistors is relatively complicated, and it is also difficult to achieve large-sized display devices due to limitations of the laser crystallization process. At present, the circuit structure of gate drive circuits still needs to be simplified, and there is still room for improvement in the working performance and output signal of the gate drive circuits.

SUMMARY

A shift register unit is proposed in an embodiment of this application. The shift register unit comprises: an input circuit configured to receive a first clock signal and an input signal so as to provide the input signal to a first node under a control of the first clock signal; a first control circuit electrically connected to the first node and a second node and configured to receive the first clock signal so as to control a voltage of the second node under a control of the first clock signal and a voltage of the first node; an output circuit electrically connected to the first node and an output terminal and configured to receive a second clock signal so as to provide an output signal to the output terminal based on the second clock signal under a control of the voltage of the first node; an output voltage control circuit electrically connected to the second node and the output terminal so as to control a voltage of the output signal under a control of the voltage of the second node; and a discharge circuit electrically connected to the first node and the second node and configured to receive the second clock signal so as to achieve electrical discharge of the first node under a control of the second clock signal and the voltage of the second node.

According to some embodiments of this application, the input circuit comprises a first transistor, a control terminal of the first transistor is electrically connected to a first clock signal input terminal so as to receive the first clock signal, a first electrode of the first transistor is electrically connected to an input signal terminal so as to receive the input signal, and a second electrode of the first transistor is electrically connected to the first node.

According to some embodiments of this application, the first control circuit comprises a second transistor and a third transistor, a control terminal of the second transistor is electrically connected to a first clock signal input terminal so as to receive the first clock signal, a first electrode of the second transistor is electrically connected to a first reference voltage terminal, and a second electrode of the second transistor is electrically connected to the second node, a control terminal of the third transistor is electrically connected to the first node, a first electrode of the third transistor is electrically connected to the first clock signal input terminal, and a second electrode of the third transistor is electrically connected to the second node.

According to some embodiments of this application, the output circuit comprises a fourth transistor, a control terminal of the fourth transistor is electrically connected to the first node, a first electrode of the fourth transistor is electrically connected to a second clock signal input terminal so as to receive the second clock signal, and a second electrode of the fourth transistor is electrically connected to the output terminal.

According to some embodiments of this application, the output voltage control circuit comprises a fifth transistor, a control terminal of the fifth transistor is electrically connected to the second node, a first electrode of the fifth transistor is electrically connected to a second reference voltage terminal, and a second electrode of the fifth transistor is electrically connected to the output terminal.

According to some embodiments of this application, the discharge circuit comprises a sixth transistor and a seventh transistor connected in series between the first node and a third reference voltage terminal, a control terminal of the sixth transistor is electrically connected to a second clock signal input terminal so as to receive the second clock signal, and a control terminal of the seventh transistor is electrically connected to the second node.

According to some embodiments of this application, the shift register unit further comprises a node voltage limitation circuit electrically connected to the first node and a signal input terminal of the output circuit, wherein the node voltage limitation circuit is configured to limit an amplitude of the voltage of the first node.

According to some embodiments of this application, the output circuit comprises a fourth transistor, a control terminal of the fourth transistor is electrically connected to the first node, a first electrode of the fourth transistor is electrically connected to a second clock signal input terminal so as to receive the second clock signal, and a second electrode of the fourth transistor is electrically connected to the output terminal, the node voltage limitation circuit comprises an eighth transistor, a first electrode and a second electrode of the eighth transistor are electrically connected to the first node and the control terminal of the fourth transistor respectively, and a control terminal of the eighth transistor is configured to receive a fourth reference voltage such that the eighth transistor is in an on state.

According to some embodiments of this application, the output circuit comprises a fourth transistor, a control terminal of the fourth transistor is electrically connected to the first node, a first electrode of the fourth transistor is electrically connected to a second clock signal input terminal so as to receive the second clock signal, and a second electrode of the fourth transistor is electrically connected to the output terminal, the node voltage limitation circuit comprises a ninth transistor, a first electrode and a control terminal of the ninth transistor are electrically connected to the first node, and a second electrode of the ninth transistor is electrically connected to a fifth reference voltage terminal so as to receive a fifth reference voltage.

According to some embodiments of this application, the output voltage control circuit further comprises a first capacitor electrically connected between the first electrode of the fifth transistor and the control terminal of the fifth transistor.

According to some embodiments of this application, the output circuit further comprises a second capacitor electrically connected between the output terminal and the control terminal of the fourth transistor.

According to some embodiments of this application, the output voltage control circuit further comprises a tenth transistor, a first electrode and a second electrode of the tenth transistor are connected to the second node and the control terminal of the fifth transistor respectively, and a control terminal of the tenth transistor is configured to receive a sixth reference voltage such that the tenth transistor is in an on state.

According to some embodiments of this application, a width-to-length ratio of a channel of the fourth transistor is greater than a width-to-length ratio of a channel of the eighth transistor.

Another embodiment of the application provides a gate drive circuit, the gate drive circuit comprises multiple shift register units connected in cascade, each shift register unit of the multiple shift register units being the shift register unit according to any one of the foregoing embodiments.

Yet another embodiment of the application provides a display device, comprising the gate drive circuit according to the above embodiment.

These and other advantages of this application will become clear according to the embodiments described below, and be expounded with reference to the embodiments described below.

BRIEF DESCRIPTION OF DRAWINGS

Next the embodiments of this application will be described in detail with reference to the drawings, wherein.

DETAILED DESCRIPTION OF EMBODIMENTS

The following description provides specific details of various embodiments of this application to enable those skilled in the art to fully understand and carry out these embodiments of this application. In some cases, this application does not illustrate or elaborate structures or functions well known in the art lest unnecessary elaboration should blur the description of the embodiments. The technical solution of this application may be embodied in different forms and purposes, and should not be limited by the embodiments described herein. These embodiments are provided to make the technical solution of this application clear and complete rather than limit the protection scope of this patent application.

Some of the terms involved in the embodiments of this application will be explained here first to facilitate understanding by those skilled in the art.

The "control terminal" mentioned herein refers to a gate of a transistor for receiving scanning signals, the transistor may be in an on state or an off state under the control of the signals received by the control terminal, and the "first electrode" mentioned herein refers to one of the two terminals among the terminals of the transistor other than the control terminal, and the "second electrode" refers to the other of the two terminals among the terminals of the transistor other than the control terminal. That is, the first electrode may be one of the source and the drain of the transistor, and the second electrode may be the other of the source and the drain of the transistor. The "display device" mentioned herein may be either a complete display product having an image display function, or part of the components of a complete display product, but the part of the components comprise the gate drive circuit according to the embodiments of this application.

Figure 1:
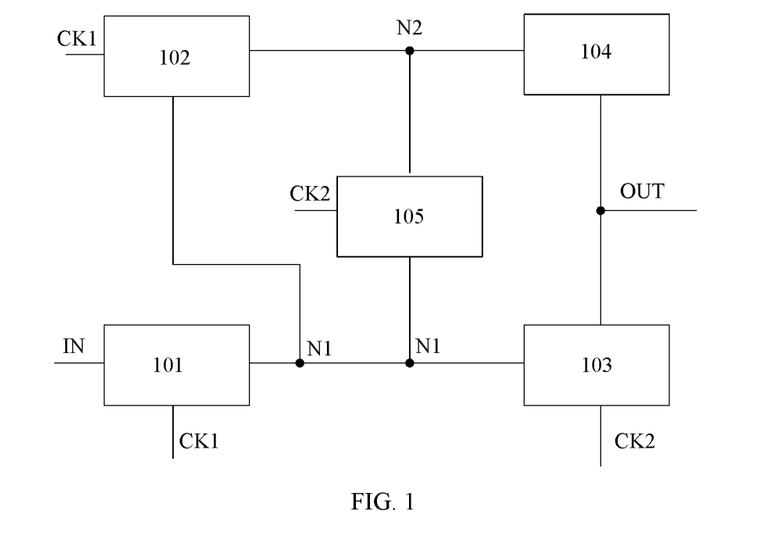
FIG. 1 illustrates a schematic view of a circuit module in a shift register unit according to an embodiment of this application.

FIG. 1 schematically shows an exemplary topology structure of a shift register unit according to an embodiment of this application. As shown in FIG. 1, the shift register unit comprises an input circuit 101, a first control circuit 102, an output circuit 103, an output voltage control circuit 104 and a discharge circuit 105. The input circuit 101 is configured to receive a first clock signal CK1 and an input signal IN so as to provide the input signal IN to a first node N1 under the control of the first clock signal CK1. The first control circuit 102 is electrically connected to the first node N1 and a second node N2 and configured to receive the first clock signal CK1, so as to control a voltage of the second node N2 under the control of the first clock signal CK1 and a voltage of the first node N1. The output circuit 103 is electrically connected to the first node N1 and an output terminal of the shift register unit and configured to receive a second clock signal CK2 so as to provide an output signal OUT to the output terminal based on the second clock signal CK2 under the control of the voltage of the first node N1. The output voltage control circuit 104 is electrically connected to the second node N2 and the output terminal so as to control a voltage of the output terminal under the control of the voltage of the second node N2. The discharge circuit 105 is electrically connected to the first node N1 and the second node N2 and configured to receive the second clock signal CK2 so as to achieve electrical discharge of the first node N1 under the control of the second clock signal CK2 and the voltage of the second node N2.

The shift register unit shown in FIG. 1 may receive the input signal IN, the first clock signal CK1 and the second clock signal CK2, and provide the output signal OUT having a desired pulse level at the output terminal. The input signal IN may be provided periodically, and accordingly, the output signal OUT having a desired pulse level may be output periodically from the output terminal. In each cycle period, after the output signal OUT having the desired pulse level is output from the output terminal and before the arrival of the next cycle period, the discharge circuit 105 can discharge the first node N1, so as to clear charges accumulated on the first node and improve the accuracy of control over the output circuit 103 in the next cycle. Each circuit in the shift register unit shown in FIG. 1 may be implemented based on metal oxide thin film transistors, and the structure of the circuit is very simple and may be applied to a gate drive circuit of an organic light-emitting diode display device to provide scanning drive signals to a drive component in a pixel circuit of the organic light-emitting diode display device.

Figure 2:
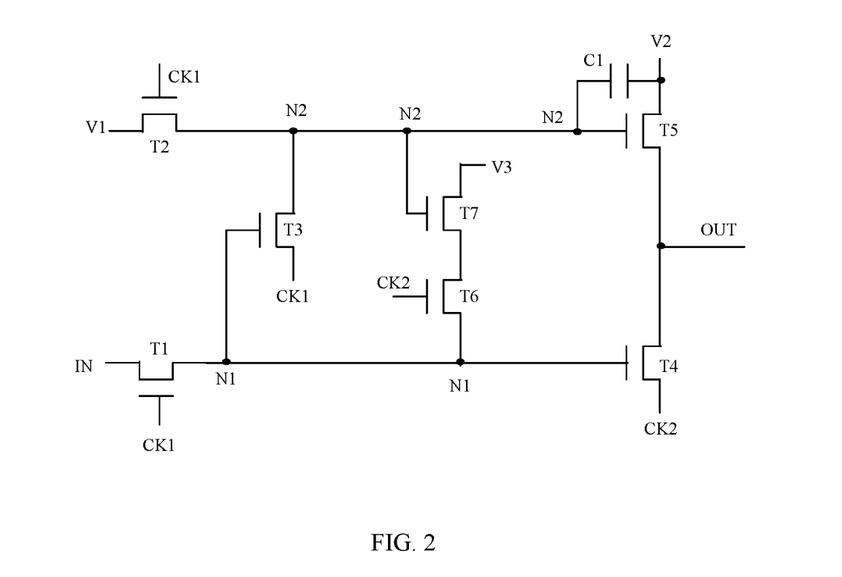
FIG. 2 illustrates an electrical schematic diagram of a shift register unit according to an embodiment of this application.

Embodiments of the shift register unit will be further described below through specific examples. FIG. 2 shows an example of the electrical schematic diagram of the shift register unit. As shown in FIG. 2, the input circuit may comprise a first transistor T1, a control terminal of the first transistor being electrically connected to a first clock signal input terminal to receive the first clock signal CK1, a first electrode of the first transistor T1 being electrically connected to an input signal terminal to receive the input signal IN, and a second electrode of the first transistor T1 being electrically connected to the first node N1. Thereby, the first transistor T1 may provide the input signal IN to the first node N1 under the control of the first clock signal CK1. The first control circuit may comprise a second transistor T2 and a third transistor T3, a control terminal of the second transistor T2 being electrically connected to the first clock signal input terminal so as to receive the first clock signal CK1, a first electrode of the second transistor T2 being electrically connected to a first reference voltage terminal to receive a first reference voltage V1, and a second electrode of the second transistor T2 being electrically connected to the second node N2. A control terminal of the third transistor T3 being electrically connected to the first node N1, a first electrode of the third transistor T3 being electrically connected to the first clock signal input terminal to receive the first clock signal CK1, and a second electrode of the third transistor T3 being electrically connected to the second node N2. The output circuit comprises a fourth transistor T4, a control terminal of the fourth transistor T4 being electrically connected to the first node N1, a first electrode of the fourth transistor T4 being electrically connected to a second clock signal input terminal to receive the second clock signal CK2, and a second electrode of the fourth transistor T4 being electrically connected to the output terminal. In this way, the fourth transistor T4 may output the output signal OUT from the output terminal based on the second clock signal CK2 under the control of the first node N1. The output voltage control circuit comprises a fifth transistor T5, a control terminal of the fifth transistor T5 being electrically connected to the second node N2, a first electrode of the fifth transistor T5 being electrically connected to a second reference voltage terminal to receive a second reference voltage V2, and a second electrode of the fifth transistor T5 being electrically connected to the output terminal. Therefore, the output voltage control circuit may control the voltage of the output terminal by means of the fifth transistor such that a desired pulse signal is generated at the output terminal. The discharge circuit 105 comprises a sixth transistor T6 and a seventh transistor T7, and as shown in FIG. 2, the sixth transistor T6 and the seventh transistor T7 are connected in series between the first node N1 and a third reference voltage terminal, a control terminal of the sixth transistor T6 being electrically connected to the second clock signal input terminal to receive the second clock signal CK2, and a control terminal of the seventh transistor being electrically connected to the second node N2. A first electrode of the seventh transistor T7 is electrically connected to the third reference voltage terminal so as to receive a third reference voltage, and a second electrode of the seventh transistor T7 is electrically connected to a first electrode of the sixth transistor T6, and a second electrode of the transistor T6 is electrically connected to the first node N1. Thus, the sixth transistor T6 and the seventh transistor T7 in the discharge circuit may achieve electrical discharge of the first node N1 under the control of the second clock signal CK2 and the voltage of the second node N2.

Figure 3:
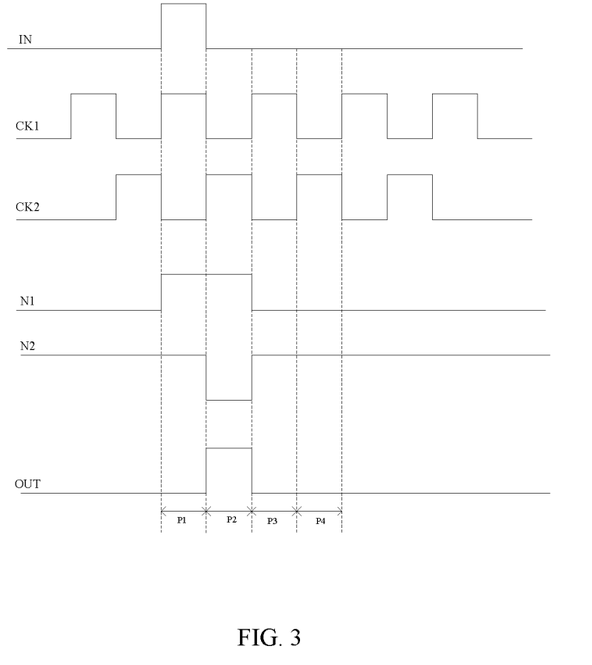
FIG. 3 illustrates a signal timing diagram for the shift register unit shown in FIG. 2.

Next, the operation principle of the shift register unit shown in FIG. 2 will be described in detail by means of specific examples. FIG. 3 illustrates examples of the input signal, the first clock signal and the second clock signal provided to the shift register unit shown in FIG. 2, as well as examples of the output signal of the output terminal of the shift register unit, the voltage of the first node and the voltage of the second node. It could be understood that the waveforms shown in FIG. 3 is only used for illustrating operation principle of the shift register unit shown in FIG. 2, rather than representing the actual waveforms of the shift register unit shown in FIG. 2 during operation.

As shown in FIG. 3, the operation cycle of the shift register unit shown in FIG. 2 may include four periods P1~P4. In this example, the transistors (the first to the seventh transistors) in each circuit module shown in FIG. 2 are all N-type transistors, the first reference voltage V1 is a high level signal, and the second reference voltage V2 and the third reference voltage V3 are both low level signals. During the first period P1, the input signal IN and the first clock signal CK1 change from a low level to a high level, and the second clock signal CK2 changes from a high level to a low level, and correspondingly, the first transistor T1 and the second transistor T2 are turned on, and the voltage of the first node N1 and the voltage of the second node both show high levels. Thereby, the third transistor T3, the fourth transistor T4 and the fifth transistor T5 are all turned on, whereas the second clock signal CK2 and the second reference voltage V2 are both at a low level, so the output signal OUT of the output terminal remains at a low level. Besides, since the second clock signal CK2 is at a low level, the sixth transistor T6 is in an off state, and the voltage of the first node N1 is not affected by the third reference voltage V3 at this time. During the second period P2, the input signal IN and the first clock signal CK1 change from a high level to a low level, and the second clock signal CK2 changes from a low level to a high level. Correspondingly, the first transistor T1 and the second transistor T2 are both in an off state, and the voltage of the first node N1 may remain at a high level due to the existence of the parasitic capacitance of the fourth transistor, so the third transistor T3 may remain in an on state such that the voltage of the second node N2 changes from a high level to the level of the first clock signal CK1 (i.e., a low level). As a result, the fifth transistor T5 and the seventh transistor T7 are in an off state, whereas the fourth transistor T4 may remain in an on state. Therefore, the output signal OUT of the output terminal of the shift register unit only depends on the second clock signal CK2 at this time, and as shown in FIG. 3, the output signal OUT changes from a low level to a high level. Besides, since the seventh transistor is in an off state, the voltage of the first node N1 is not affected by the third reference voltage V3. During the third period P3, the input signal IN remains at a low level, and the first clock signal CK1 changes from a low level to a high level, and the second clock signal CK2 changes from a high level to a low level. Correspondingly, the first transistor T1 and the second transistor T2 are both in an on state, and the voltage of the first node N1 becomes a low level, and the voltage of the second node N2 becomes a high level, so the third transistor T3, the fourth transistor T4 and the sixth transistor T6 are in an off state, and the fifth transistor T5 is in an on state, and the output signal OUT of the shift register unit depends on the second reference voltage V2 at this time, so the output signal OUT remains at a low level at this time. The voltage of the first node N1 is not affected by the third reference voltage V3. During the fourth period P4, the input signal IN remains at a low level, and the first clock signal CK1 changes from a high level to a low level, and the second clock signal CK2 changes from a low level to a high level. Correspondingly, the first transistor T1 and the second transistor T2 are in an off state, and the second node N2 remains at a high level due to the existence of the parasitic capacitance of the fifth transistor, and the fifth transistor T5, the sixth transistor T6 and the seventh transistor T7 are all in an on state, whereas the first node N1 remains at the previous low level, and the fourth transistor T4 and the third transistor T3 are in an off state, and a current path from the first node N1 to the third reference voltage terminal is formed via the sixth transistor T6 and the seventh transistor T7, i.e., the sixth transistor T6 and the seventh transistor T7 may form a discharge path for the first node N1 such that charges on the first node N1 are released sufficiently, which helps to accurately control the fourth transistor T4 to be turned on or off in the next cycle and thus enhance the accuracy of the pulse waveform of the obtained output signal. Therefore, in a single cycle including the above four periods P1~P4, the shift register unit generates from its output terminal an output signal OUT having a high-level pulse as shown in FIG. 3. In the embodiment of FIG. 2, in order to enhance the stability of the voltage of the second node N2, the shift register unit further comprises a first capacitor C1 electrically connected between the first electrode of the fifth transistor T5 and the second node N2.

Figure 4:
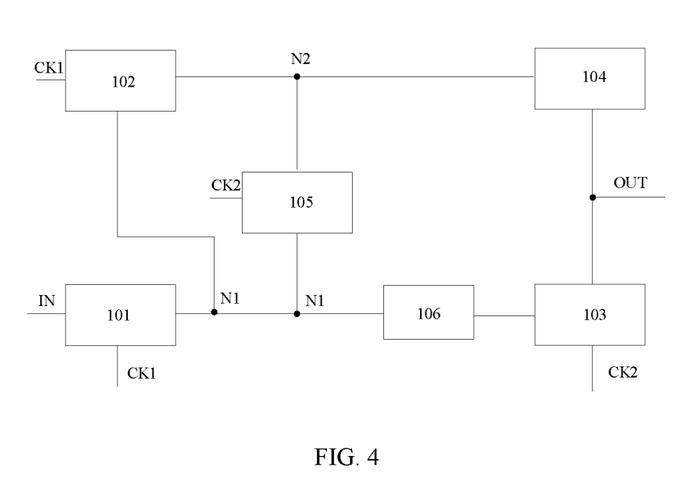
FIG. 4 illustrates a schematic view of a circuit module in a shift register unit according to another embodiment of this application.

FIG. 4 shows a structural block diagram of a shift register unit according to another embodiment of this application. Apart from the circuit modules in the shift register unit shown in FIG. 1, the shift register unit shown in FIG. 4 further comprises a node voltage limitation circuit 106, the node voltage limitation circuit 106 being electrically connected to the first node N1 and a signal input terminal of the output circuit 103 and configured to limit an amplitude of the voltage of the first node N1. In this embodiment, the node voltage limitation circuit 106 can alleviate or avoid the influence of possible voltage fluctuations (e.g., a sudden rise in the voltage) of the output circuit 103 on the voltage of the first node N1 and promote stability of the voltage of the first node N1, which is beneficial for protecting the transistors electrically connected to the first node N1 and delaying the aging of the transistors electrically connected to the first node N1 or reducing the threshold voltage shift of related transistors.

Figure 5:
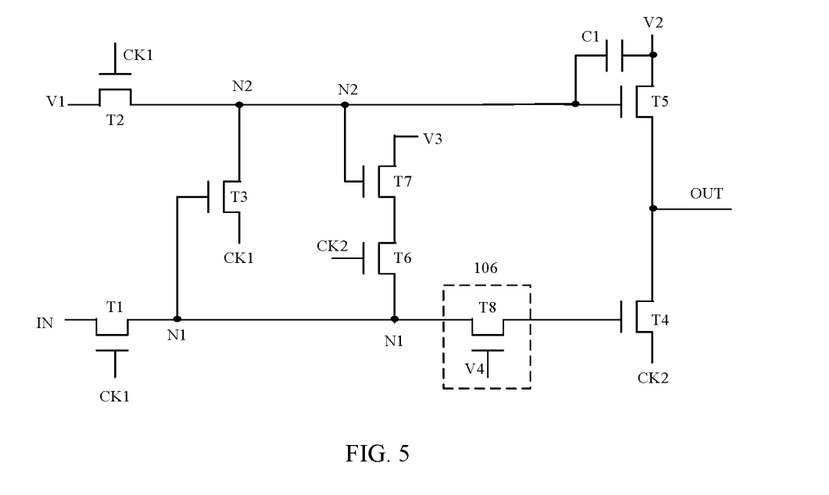
FIG. 5 illustrates an electrical schematic diagram of a shift register unit according to another embodiment of this application.

FIG. 5 shows an electrical schematic diagram of a shift register unit according to another embodiment of this application. As shown in FIG. 5, the node voltage limitation circuit 106 of the shift register unit comprises an eighth transistor T8, and the output circuit comprises a fourth transistor T4. A first electrode and a second electrode of the eighth transistor T8 are electrically connected to the first node N1 and a control terminal of the fourth transistor T4 respectively, and a control terminal of the eighth transistor T8 is configured to receive a fourth reference voltage V4 such that the eighth transistor T8 is in an on state. A first electrode of the fourth transistor T4 is electrically connected to a second clock signal input terminal to receive a second clock signal CK2, and a second electrode of the fourth transistor T4 is electrically connected to an output terminal of the shift register unit. For the shift register unit shown in FIG. 5, when the shift register unit is in operation, the eighth transistor T8 is always in an on state, and the fourth reference voltage V4 is a constant high level signal in case the eighth transistor T8 is an N-type transistor.

Returning to the embodiment shown in FIG. 2, due to the existence of the parasitic capacitance of the fourth transistor T4, if the voltage level of the output signal OUT of the shift register unit rises suddenly, the voltage level of the first node N1 will also experience a sudden rise, which is unfavorable to the third transistor T3, the sixth transistor T6 and the first transistor T1 in electrical connection with the first node N1, and in particular, an excessively high voltage of the first node N1 may cause the threshold of the third transistor T3 to shift. However, in the embodiment of FIG. 5, the eighth transistor T8 in an on state may serve as a buffer for the voltage of the first node N1, and even if the amplitude of the voltage of the output signal OUT of the shift register unit rises suddenly, the amplitude of the voltage of the first node N1 can be limited, and thereby the influence of the output signal of the output circuit on the voltage of the first node N1 could be reduced. Thus, the first transistor T1, the third transistor T3 and the sixth transistor T6 in electrical connection with the first node N1 can be immune to the adverse influences of a sudden rise in the voltage level of the output signal OUT.

Figure 6:
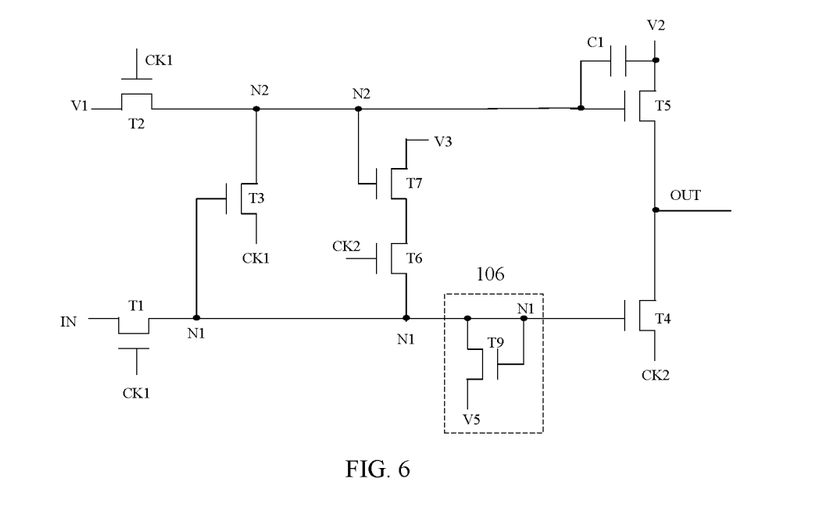
FIG. 6 illustrates an electrical schematic diagram of a shift register unit according to another embodiment of this application.

FIG. 6 shows an electrical schematic diagram of a shift register unit according to another embodiment of this application. As shown in FIG. 6, the node voltage limitation circuit 106 in the shift register unit comprises a ninth transistor T9, a first electrode and a control terminal of the ninth transistor T9 are electrically connected to the first node N1 respectively, and a second electrode of the ninth transistor T9 is electrically connected to a fifth reference voltage terminal to receive a fifth reference voltage V5. In this embodiment, if the voltage of the first node N1 rises suddenly under the influence of the output signal of the shift register unit, for example, the voltage of the first node N1 exceeds a threshold voltage of the ninth transistor T9, the ninth transistor T9 would be turned on, thereby pulling down the voltage of the first node N1 to the fifth reference voltage V5. The fifth reference voltage V5 may be a voltage having a constant amplitude, and the amplitude of the fifth reference voltage V5 may be set to be close to the amplitude of the high-level pulse of the input signal IN. Therefore, the node voltage limitation circuit 106 in the embodiment of FIG. 6 can also limit the amplitude of the voltage of the first node N1 properly.

According to some embodiments of this application, the output voltage control circuit 104 of the shift register unit further comprises a first capacitor C1 electrically connected between the first electrode of the fifth transistor T5 and the control terminal of the fifth transistor T5. As shown in FIG. 2, FIG. 5 and FIG. 6, a first capacitor C1 is connected between the control terminal and the first electrode of the fifth transistor T5, which can enhance the stability of the voltage of the second node N2 and facilitate rapid control over the fifth transistor T5.

Figure 7:
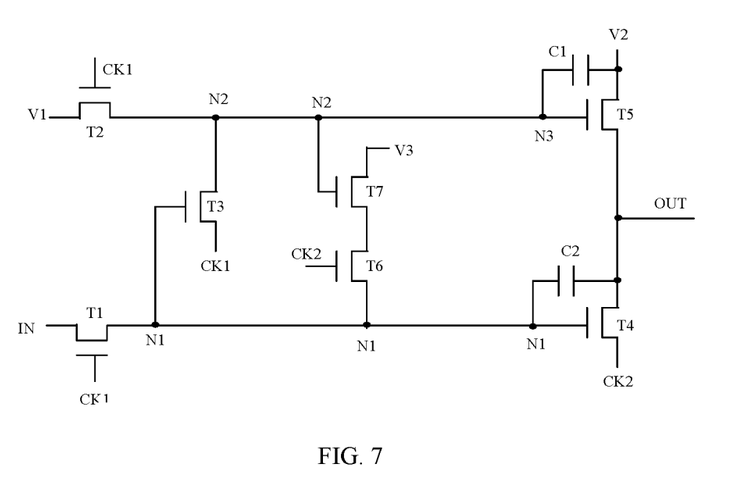
FIG. 7 illustrates an electrical schematic diagram of a shift register unit according to another embodiment of this application.

As shown in FIG. 7, according to another embodiment of this application, the output circuit of the shift register unit further comprises a second capacitor C2 electrically connected between the output terminal of the shift register unit and the control terminal of the fourth transistor T4. The embodiment shown in FIG. 7 is favorable to the application of the shift register unit to a high resolution display device, because the second capacitor C2 can promote the switching rate of the fourth transistor T4 in the output circuit, or in other words, decrease the switching time between an off state and an on state of the fourth transistor T4 and enable the shift register unit to generate a larger output current.

Figure 8:
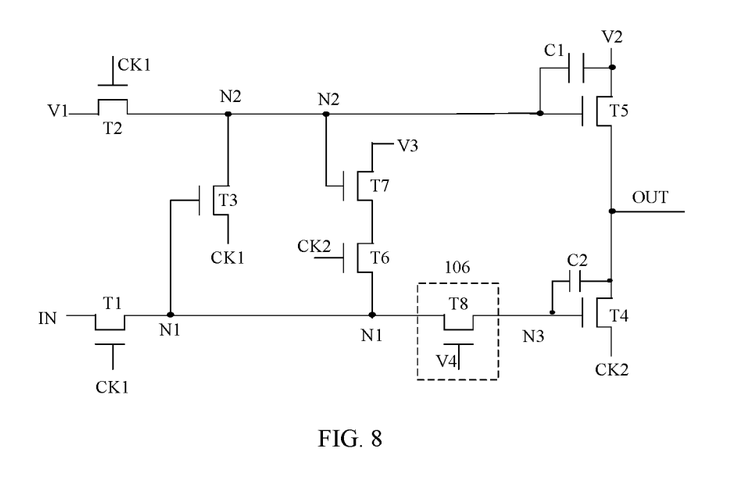
FIG. 8 illustrates an electrical schematic diagram of a shift register unit according to another embodiment of this application.

FIG. 8 illustrates an electrical schematic diagram of a shift register unit according to yet another embodiment of this application. Similar to the embodiment of FIG. 7, in this embodiment, the output circuit of the shift register unit comprises a second capacitor C2 connected between the control terminal of the fourth transistor T4 and the output terminal of the shift register unit. Meanwhile, the shift register unit further comprises a node voltage limitation circuit 106, and the fourth transistor T4, the second capacitor C2 and an eighth transistor T8 in the node voltage limitation circuit 106 are electrically connected to a third node N3 in conjunction. This contributes to rapid turning-on of the fourth transistor T4 in the output circuit, further, the influence of possible voltage fluctuations (e.g., a sudden rise in the voltage) of the output circuit 103 on the voltage of the first node N1 can be reduced due to the node voltage limitation circuit 106, which is advantageous to the stability of the voltage of the first node N1, thereby facilitating protection of the transistors in electrical connection with the first node N1.

Figure 9:
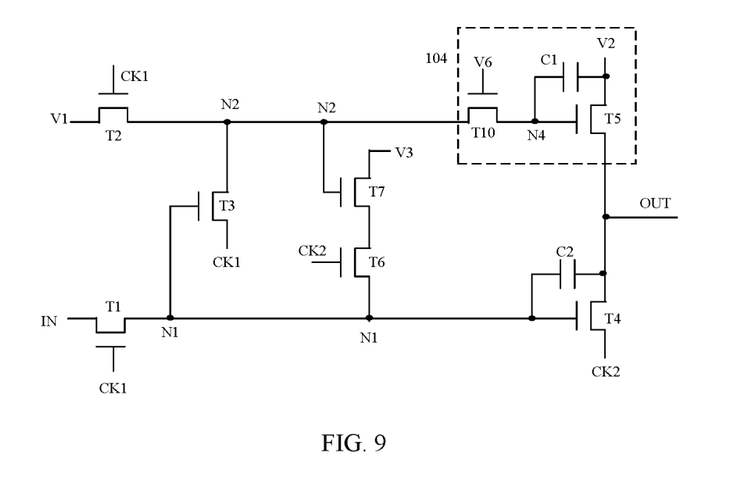
FIG. 9 illustrates an electrical schematic diagram of a shift register unit according to another embodiment of this application.
Figure 10:
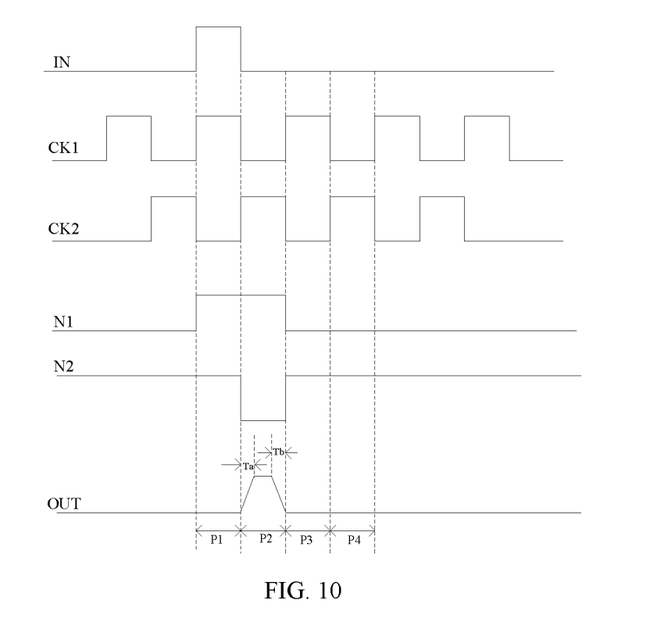
FIG. 10 illustrates periods of time for level changes in the output signal of the shift register unit shown in FIG. 5 or FIG. 6.

According to further embodiments of this application, the output voltage control circuit of the shift register unit further comprises a tenth transistor, a first electrode and a second electrode of the tenth transistor being connected to the second node and the control terminal of the fifth transistor respectively, and a control terminal of the tenth transistor being configured to receive a sixth reference voltage such that the tenth transistor is in an on state. FIG. 9 shows an electrical schematic diagram of a shift register unit according to this embodiment. In the embodiment of FIG. 9, the tenth transistor T10 is an N-type metal oxide transistor, and the sixth reference voltage V6 may be a high-level signal having a constant voltage. The tenth transistor T10, the first capacitor C1 and the fifth transistor T5 are connected to the fourth node N4 in conjunction. The tenth transistor T10 may serve as a buffer between the second node N2 and the fourth node N4, thereby alleviating or avoiding adverse influences of sudden changes in the voltage of either of the second node N2 and the fourth node N4 on the voltage of the other of the second node N2 and the fourth node N4. Besides, through experimental research, it was found that the tenth transistor T10 is beneficial for decreasing the time it takes for the output signal OUT of the shift register unit to change between different levels. Changes in the waveform of the output signal OUT of the shift register unit will be explained schematically by means of FIG. 10. FIG. 10 is used to illustrate periods of time for level changes in the output signal of the shift register unit shown in FIG. 5 or FIG. 6. As shown in FIG. 10, during the actual operation of the shift register unit, the output signal OUT of the output terminal may not be a regular square wave pulse as shown in FIG. 3, but an output signal similar to a trapezoidal pulse as shown in FIG. 10. In other words, it needs to take certain time for the output signal OUT to change from a low level to a high level and from a high level to a low level. As shown in FIG. 10, Ta indicates the time it takes for the output signal OUT to change from a low level to a high level, and Tb indicates the time it takes for the output signal OUT to change from a high level to a low level. The smaller the time Ta and Tb, the higher the quality of the output signal OUT of the shift register unit. As compared with the shift register unit shown in FIG. 2, the shift register unit shown in FIG. 9 can reduce the time Ta it takes for the output signal OUT as shown in FIG. 10 to change from a low level to a high level and the time Tb it takes for the output signal OUT to change from a high level to a low level by providing the tenth transistor T10 in the output voltage control circuit, i.e., the quality of the output signal of the shift register unit is improved.

Figure 11:
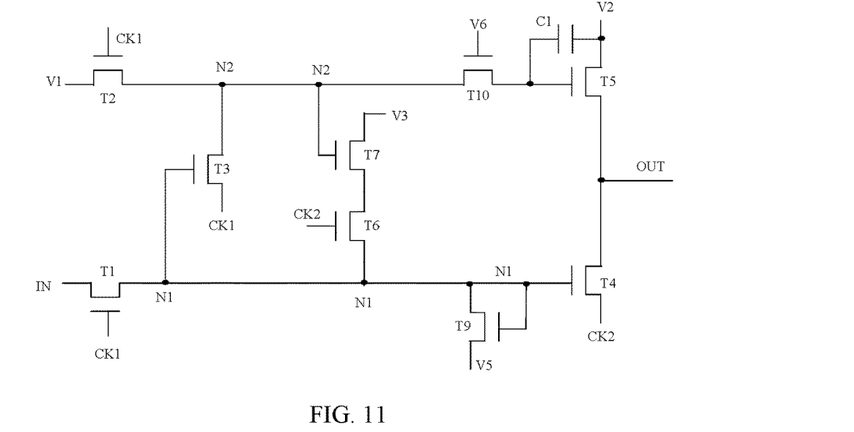
FIG. 11 illustrates an electrical schematic diagram of a shift register unit according to yet another embodiment of this application.

FIG. 11 illustrates an electrical schematic diagram of a shift register unit according to yet another embodiment of this application. In this embodiment, the shift register unit comprises a node voltage limitation circuit, and the node voltage limitation circuit comprises a ninth transistor T9. A first electrode and a control terminal of the ninth transistor T9 are electrically connected to the first node N1 respectively, and a second electrode of the ninth transistor T9 is electrically connected to a fifth reference voltage terminal to receive a fifth reference voltage V5. Besides, the output voltage control circuit comprises a fifth transistor T5, a tenth transistor T10 and a first capacitor C1. A first electrode and a second electrode of the tenth transistor T10 are connected to the second node N2 and the control terminal of the fifth transistor T5 respectively, and a control terminal of the tenth transistor T10 receives a sixth reference voltage V6 such that the tenth transistor T10 is in an on state. In this embodiment, when the voltage of the first node N1 rises suddenly, the ninth transistor T9 can limit the amplitude of the voltage of the first node N1 properly. For example, if the voltage of the first node N1 exceeds a threshold voltage of the ninth transistor T9, the ninth transistor T9 will be turned on, thereby pulling down the voltage of the first node N1 to the fifth reference voltage V5. The fifth reference voltage V5 may be a voltage having a constant amplitude, and the amplitude of the fifth reference voltage V5 may be set to be close to the amplitude of the high-level pulse of the input signal IN. Meanwhile, with the tenth transistor T10 in the output voltage control circuit, the quality of the output signal of the shift register unit can be improved.

Figure 12:
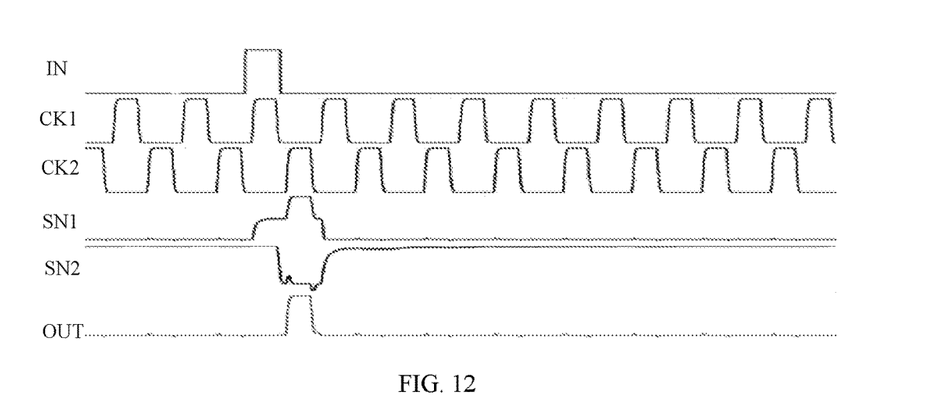
FIG. 12 shows voltage waveforms of related nodes and waveforms of the output signal when the shift register unit according to the embodiment of FIG. 9 is in operation.
Figure 13:
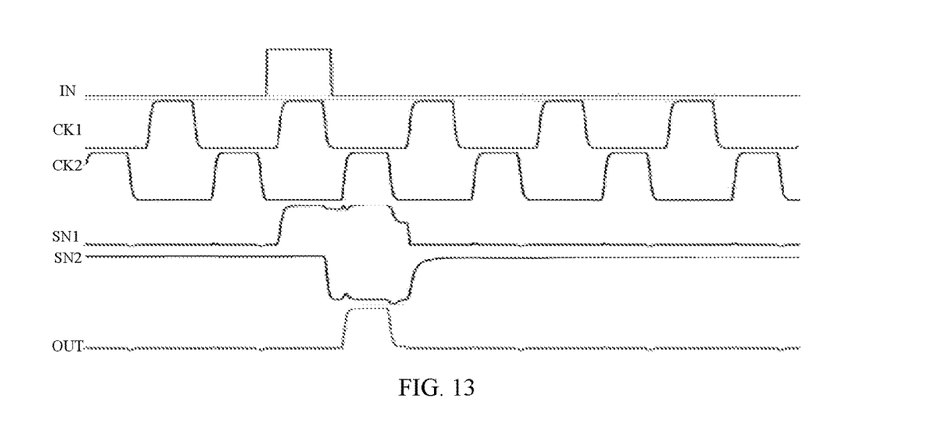
FIG. 13 shows voltage waveforms of related nodes and waveforms of the output signal when the shift register unit according to the embodiment of FIG. 11 is in operation.

Next, differences in signals of related nodes and the output signal of the shift register units according to the above different embodiments will be explained schematically by means of FIG. 12 and FIG. 13. FIG. 12 shows voltage waveforms of related nodes and waveforms of the output signal when the shift register unit according to the embodiment of FIG. 9 is in operation. FIG. 13 shows voltage waveforms of related nodes and waveforms of the output signal when the shift register unit according to the embodiment of FIG. 11 is in operation. As shown in FIG. 12, the input signal, the first clock signal and the second clock signal provided to the shift register unit are identified as IN, CK1 and CK2 respectively. The waveforms denoted by SN1 and SN2 in FIG. 12 represent the waveforms of the voltages of the first node N1 and the second node N2 in FIG. 9 respectively. As can be seen from FIG. 12, during the period of time corresponding to the high-level pulse of the output signal OUT, there is a significant sudden rise in the voltage SN1 of the first node N1, which may result from the change of the output signal OUT from a low level to a high level. The sudden rise of the voltage SN1 of the first node N1 may be unfavorable to the service life of the third transistor T3, the sixth transistor T6 and the first transistor T1, and even cause shift of the threshold voltage of the third transistor T3. However, as shown in FIG. 13, for the shift register unit shown in FIG. 11, due to the node voltage limitation circuit (i.e., the ninth transistor T9), the voltage SN1 of the first node N1 does not have a sudden rise like the voltage shown in FIG. 12 even during the high level pulse period of the output signal OUT, but substantially remains constant. Moreover, as can be seen from FIG. 12 and FIG. 13, it takes a shorter time for the output signal OUT to change between a high level and a low level, i.e., both a rising edge and a falling edge of the high-level pulse of the output signal OUT shows a trend of change like a right angle, and the output signal OUT has a pulse waveform of a higher quality, which is mainly attributed to the tenth transistor T10 in the output voltage control circuit of the shift register unit.

Figure 14:
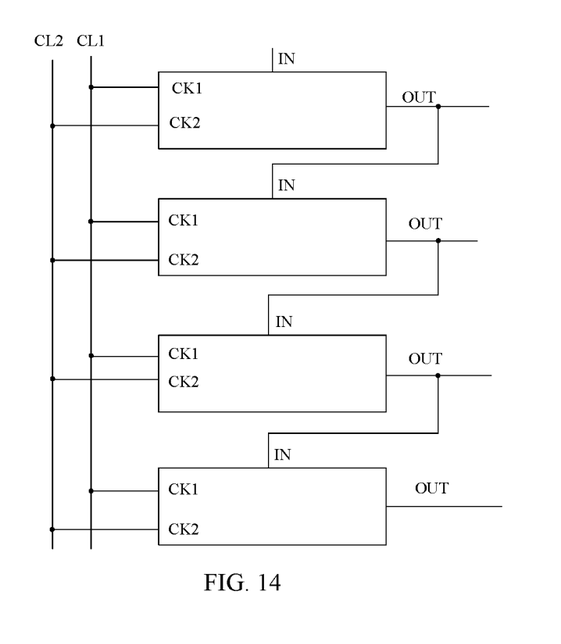
FIG. 14 illustrates multiple shift register units connected in cascade in a gate drive circuit according to another embodiment of this application.

The shift register unit mentioned in the above embodiments may be applied to a display device, and the output signal generated by the shift register unit may be used as a scanning signal for the pixel circuit in the display device. Therefore, a gate drive circuit is provided in another embodiment of this application, the gate drive circuit comprising multiple shift register units according to any one of the above embodiments connected in cascade. The phrase "connected in cascade" mentioned herein refers to the multiple shift register units are connected to form a shift register string, and an output signal of a former shift register unit of the string serves as an input signal of a latter shift register unit of the string. FIG. 14 schematically shows four shift register units connected in cascade. Each shift register unit comprises an input signal terminal for receiving an input signal IN, an output signal terminal for providing an output signal OUT, a first clock signal input terminal for receiving a first clock signal CK1 and a second clock signal input terminal for receiving a second clock signal CK2. Reference voltage terminals of the shift register units for receiving respective reference voltages are not shown in FIG. 14 for simplicity. The first clock signal input terminal and the second clock signal input terminal of each shift register unit may be electrically connected to a first clock signal line CL1 and a second clock signal line CL2 respectively. Although FIG. 14 shows four shift register units connected in cascade, the gate drive circuit in a display device may comprise any number of shift register units, which will not be limited in the embodiments of this application. Besides, although each circuit module in the examples of the circuit diagram of the shift register unit in this application is implemented as an N-type transistor, this cannot be interpreted as a limitation to the protection scope of this application, and based on the embodiments disclosed in this application, a circuit module implemented based on a P-type transistor belongs to an obvious variant of the embodiments disclosed in this application, and also falls within the protection scope of this patent application.

A display device is provided in yet another embodiment of this application, and the display device may comprise the gate drive circuit according to the above embodiments. As discussed above, the "display device" mentioned herein may be either a complete display product having an image display function, or part of the components of a complete display product. For instance, examples of the display device may comprise an array substrate including a gate drive circuit, a display panel and a finished display device ready for sale, etc.

Figure 15:
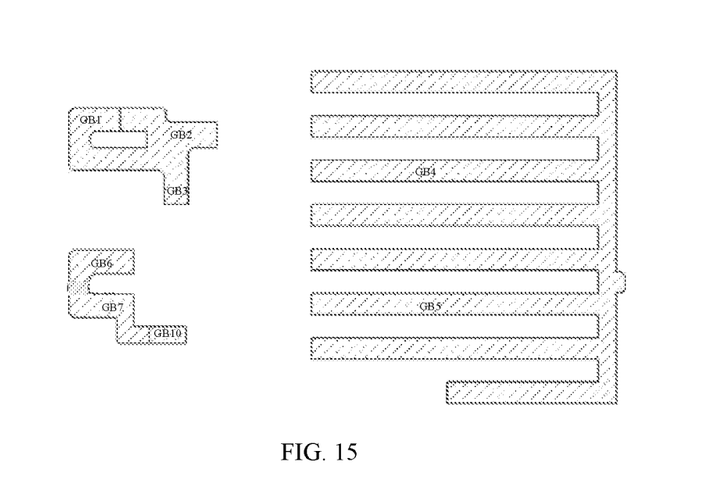
FIG. 15 illustrates layout examples of the bottom gates of the transistors in the shift register unit shown in FIG. 9.

In some embodiments, each transistor (e.g., the first to the tenth transistors) in the shift register unit described above with reference to the figures may comprise a double-gate transistor, i.e., each transistor may comprise a bottom gate, a top gate and a semiconductor layer or an active layer located between the bottom gate and the top gate. In this way, the performance of the transistor can be regulated by controlling the voltage applied to the bottom gate, and the transistor is in an on or off state in response to the top gate receiving different signals. FIG. 15 illustrates layout examples of the bottom gates of the transistors in the shift register unit of FIG. 9. Referring to FIG. 9 and FIG. 15, the fourth transistor T4 and the fifth transistor T5 comprise bottom gates GB4 and GB5 respectively, and the bottom gate GB4 of the fourth transistor T4 and the bottom gate GB5 of the fifth transistor T5 are connected with each other. As can be seen from FIG. 15, the bottom gate GB4 of the fourth transistor T4 and the bottom gate GB5 of the fifth transistor T5 both comprise a plurality of elongated electrodes connected with each other, which facilitates a greater width-to-length ratio of the channels of the fourth transistor T4 and the fifth transistor T5. The bottom gate GB1 of the first transistor T1, the bottom gate GB2 of the second transistor T2 and the bottom gate GB3 of the third transistor T3 are connected with each other, and the bottom gate GB6 of the sixth transistor T6, the bottom gate GB7 of the seventh transistor T7 and the bottom gate GB10 of the tenth transistor T10 are connected with each other. The lengths of the bottom gates of the first transistor T1, the second transistor T2, the third transistor T3, the sixth transistor T6, the seventh transistor T7 and the tenth transistor T10 are obviously smaller than the lengths of the bottom gates of the fourth transistor T4 and the fifth transistor T5. The bottom gates of the above transistors may be formed on a base substrate which can carry structures required for the normal operation of each component in the shift register unit. In some embodiments, after the bottom gates of the transistors are formed on the base substrate, semiconductor layers (active layers) for the transistors, top gates for the transistors on the semiconductor layers, signal connection layers on the top gates and so on may be formed on the bottom gates.

Figure 16:
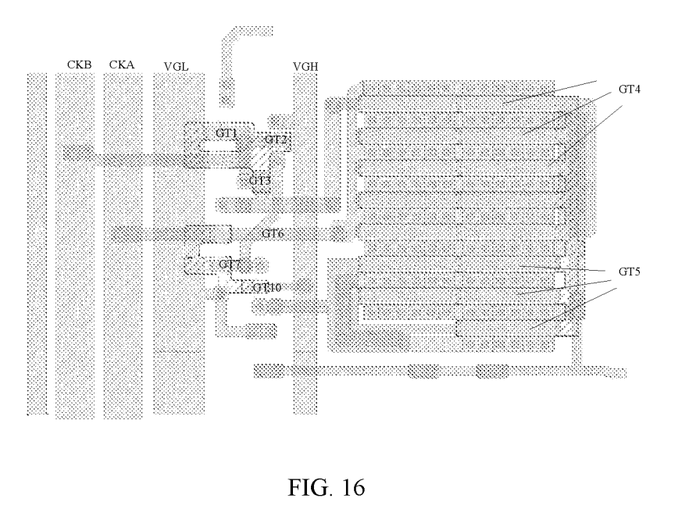
FIG. 16 illustrates a partial plan perspective view of a shift register unit, where a semiconductor layer, a top gate and a signal connection layer are formed on the bottom gates shown in FIG. 15.

FIG. 16 illustrates a partial plan perspective view of a shift register unit, where a semiconductor layer, a top gate and a signal connection layer are formed on the bottom gates shown in FIG. 15. Referring to FIG. 9 and FIG. 16, the top gates of the first transistor T1, the second transistor T2, the third transistor T3, the fourth transistor T4, the fifth transistor T5, the sixth transistor T6, the seventh transistor T7 and the tenth transistor T10 are identified as GT1, GT2, GT3, GT4, GT5, GT6, GT7 and GT10 respectively. FIG. 16 also shows clock signal lines CKA and CKB for transmitting the first clock signal and the second clock signal, a reference signal line VGH for receiving a constant high level and a reference signal line VGL for receiving a constant low level. In some embodiments, the reference signal line VGH may transmit the first reference voltage V1 and the sixth reference voltage V6 as shown in FIG. 9, and the reference signal line VGL may transmit the second reference voltage V2 and the third reference voltage V3 as shown in FIG. 9. A further metal electrode may be formed on the base substrate, and the further metal electrode may be paired with the top gates of the fourth transistor T4 and the fifth transistor T5 respectively to form the first capacitor C1 and the second capacitor C2 shown in FIG. 9. As can be seen from FIG. 15 and FIG. 16, among the transistors in the shift register unit, the width-to-length ratio of the channel of either of the fourth transistor and the fifth transistor is greater than the width-to-length ratio of the channel of any of the rest transistors in the shift register unit, such that the fourth transistor and the fifth transistor have a higher switching rate, which helps to improve the quality of the output signal of the shift register unit.

Figure 17:
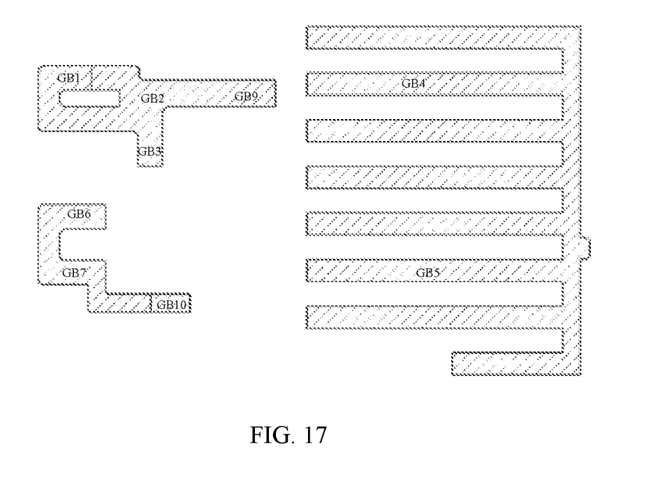
FIG. 17 illustrates layout examples of the bottom gates of the transistors in the shift register unit shown in FIG. 11.

FIG. 17 illustrates layout examples of the bottom gates of the transistors in the shift register unit shown in FIG. 11. Referring to FIG. 11 and FIG. 17, the fourth transistor T4 and the fifth transistor T5 comprise bottom gates GB4 and GB5 respectively, and the bottom gate GB4 of the fourth transistor T4 and the bottom gate GB5 of the fifth transistor T5 are connected with each other. The bottom gate GB1 of the first transistor T1, the bottom gate GB2 of the second transistor T2, the bottom gate GB3 of the third transistor T3 and the bottom gate GB9 of the ninth transistor are connected with each other, and the bottom gate GB6 of the sixth transistor T6, the bottom gate GB7 of the seventh transistor T7 and the bottom gate GB10 of the tenth transistor T10 are connected with each other. The lengths of the bottom gates of the first transistor T1, the second transistor T2, the third transistor T3, the sixth transistor T6, the seventh transistor T7 and the tenth transistor T10 are obviously smaller than the lengths of the bottom gates of the fourth transistor T4 and the fifth transistor T5.

Figure 18:
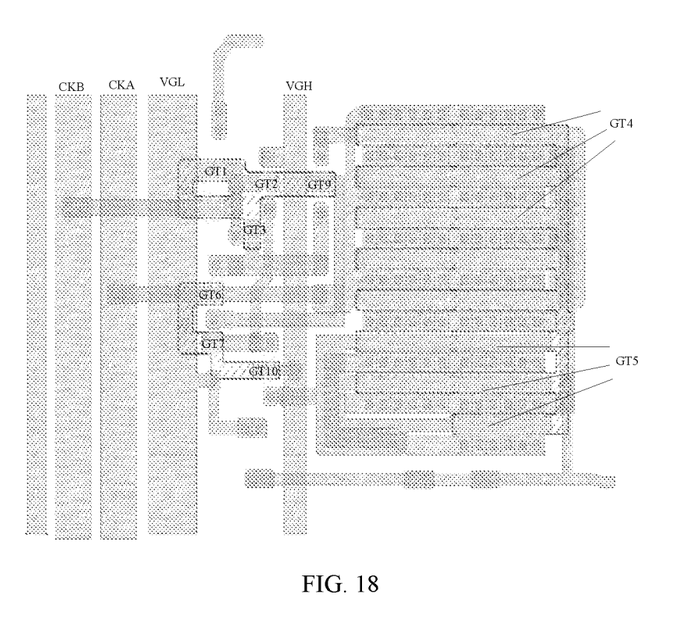
FIG. 18 illustrates a partial plan perspective view of a shift register unit where a semiconductor layer, a top gate and a signal connection layer are formed on the bottom gates shown in FIG. 17.

FIG. 18 illustrates a partial plan perspective view of a shift register unit where a semiconductor layer, a top gate and a signal connection layer are formed on the bottom gates shown in FIG. 17. Referring to FIG. 11 and FIG. 18, the top gates of the first transistor T1, the second transistor T2, the third transistor T3, the fourth transistor T4, the fifth transistor T5, the sixth transistor T6, the seventh transistor T7, the ninth transistor T9 and the tenth transistor T10 are identified as GT1, GT2, GT3, GT4, GT5, GT6, GT7, GT9 and GT10 respectively. FIG. 18 also shows clock signal lines CKA and CKB for transmitting the first clock signal and the second clock signal, a reference signal line VGH for receiving a constant high level and a reference signal line VGL for receiving a constant low level. In some embodiments, the reference signal line VGH may transmit the first reference voltage V1, the fifth reference voltage V5 and the sixth reference voltage V6 as shown in FIG. 11, and the reference signal line VGL may transmit the second reference voltage V2 and the third reference voltage V3 as shown in FIG. 11. As can be seen from FIG. 17 and FIG. 18, among the transistors in the shift register unit, the width-to-length ratio of the channel of either of the fourth transistor and the fifth transistor is greater than the width-to-length ratio of the channel of any of the rest transistors in the shift register unit, such that the fourth transistor and the fifth transistor have a higher switching rate, which helps to improve the quality of the output signal of the shift register unit.

It will be understood that although terms such as first, second and third are used herein to describe various devices, components, parts or portions, these terms should not limit the devices, components, parts or portions, but only distinguish between names. In addition, the "electrical connection" mentioned herein includes both "direct connection" and "indirect connection". Although the technical solution of this application has been described in combination with some embodiments, the protection scope of this application is not limited by the specific forms expounded herein, but is defined by the appended claims.

The invention claimed is:

1. A shift register unit comprising:
an input circuit configured to receive a first clock signal and an input signal so as to provide the input signal to a first node under a control of the first clock signal;
a first control circuit electrically connected to the first node and a second node and configured to receive the first clock signal so as to control a voltage of the second node under a control of the first clock signal and a voltage of the first node;
an output circuit electrically connected to the first node and an output terminal and configured to receive a second clock signal so as to provide an output signal to the output terminal based on the second clock signal under a control of the voltage of the first node;
an output voltage control circuit electrically connected to the second node and the output terminal so as to control a voltage of the output signal under a control of the voltage of the second node; and
a discharge circuit electrically connected to the first node and the second node and configured to receive the second clock signal so as to achieve electrical discharge of the first node under a control of the second clock signal and the voltage of the second node,
wherein the shift register unit further comprises a node voltage limitation circuit configured to limit an amplitude of the voltage of the first node, the node voltage limitation circuit comprises a ninth transistor, a first electrode and a control terminal of the ninth transistor are directly connected to the first node, and a second electrode of the ninth transistor is directly connected to a fifth reference voltage terminal so as to receive a fifth reference voltage.

2. The shift register unit according to claim 1, wherein the input circuit comprises a first transistor, a control terminal of the first transistor is electrically connected to a first clock signal input terminal so as to receive the first clock signal, a first electrode of the first transistor is electrically connected to an input signal terminal so as to receive the input signal, and a second electrode of the first transistor is electrically connected to the first node.

3. The shift register unit according to claim 1, wherein the first control circuit comprises a second transistor and a third transistor, a control terminal of the second transistor is electrically connected to a first clock signal input terminal so as to receive the first clock signal, a first electrode of the second transistor is electrically connected to a first reference voltage terminal, and a second electrode of the second transistor is electrically connected to the second node, a control terminal of the third transistor is electrically connected to the first node, a first electrode of the third transistor is electrically connected to the first clock signal input terminal, and a second electrode of the third transistor is electrically connected to the second node.

4. The shift register unit according to claim 1, wherein the output circuit comprises a fourth transistor, a control terminal of the fourth transistor is electrically connected to the first node, a first electrode of the fourth transistor is electrically connected to a second clock signal input terminal so as to receive the second clock signal, and a second electrode of the fourth transistor is electrically connected to the output terminal.

5. The shift register unit according to claim 4, wherein the output circuit further comprises a second capacitor electrically connected between the output terminal and the control terminal of the fourth transistor.

6. The shift register unit according to claim 1, wherein the output voltage control circuit comprises a fifth transistor, a control terminal of the fifth transistor is electrically connected to the second node, a first electrode of the fifth transistor is electrically connected to a second reference voltage terminal, and a second electrode of the fifth transistor is electrically connected to the output terminal.

7. The shift register unit according to claim 6, wherein the output voltage control circuit further comprises a first capacitor electrically connected between the first electrode of the fifth transistor and the control terminal of the fifth transistor.

8. The shift register unit according to claim 7, wherein the output voltage control circuit further comprises a tenth transistor, a first electrode and a second electrode of the tenth transistor are connected to the second node and the control terminal of the fifth transistor respectively, and a control terminal of the tenth transistor is configured to receive a sixth reference voltage such that the tenth transistor is in an on state.

9. The shift register unit according to claim 6, wherein the output voltage control circuit further comprises a tenth transistor, a first electrode and a second electrode of the tenth transistor are connected to the second node and the control terminal of the fifth transistor respectively, and a control terminal of the tenth transistor is configured to receive a sixth reference voltage such that the tenth transistor is in an on state.

10. The shift register unit according to claim 1, wherein the discharge circuit comprises a sixth transistor and a seventh transistor connected in series between the first node and a third reference voltage terminal, a control terminal of the sixth transistor is electrically connected to a second clock signal input terminal so as to receive the second clock signal, and a control terminal of the seventh transistor is electrically connected to the second node.

11. The shift register unit according to claim 1, wherein the output circuit comprises a fourth transistor, a control terminal of the fourth transistor is electrically connected to the first node, a first electrode of the fourth transistor is electrically connected to a second clock signal input terminal so as to receive the second clock signal, and a second electrode of the fourth transistor is electrically connected to the output terminal, wherein the node voltage limitation circuit comprises an eighth transistor, a first electrode and a second electrode of the eighth transistor are electrically connected to the first node and the control terminal of the fourth transistor respectively, and a control terminal of the eighth transistor is configured to receive a fourth reference voltage such that the eighth transistor is in an on state.

12. The shift register unit according to claim 11, wherein a width-to-length ratio of a channel of the fourth transistor is greater than a width-to-length ratio of a channel of the eighth transistor.

13. The shift register unit according to claim 11, wherein the output circuit further comprises a second capacitor electrically connected between the output terminal and the control terminal of the fourth transistor.

14. The shift register unit according to claim 1, wherein the output circuit comprises a fourth transistor, a control terminal of the fourth transistor is electrically connected to the first node, a first electrode of the fourth transistor is electrically connected to a second clock signal input terminal so as to receive the second clock signal, and a second electrode of the fourth transistor is electrically connected to the output terminal.

15. The shift register unit according to claim 14, wherein the output circuit further comprises a second capacitor electrically connected between the output terminal and the control terminal of the fourth transistor.

16. A gate drive circuit comprising multiple shift register units connected in cascade, each shift register unit of the multiple shift register units being the shift register unit according to claim 1.

17. A display device, comprising the gate drive circuit according to claim 16.

18. The shift register unit according to claim 1, the fifth reference voltage is a voltage having a constant amplitude.

* * * * *